United States Patent
Baumann et al.

(10) Patent No.: US 8,924,085 B2
(45) Date of Patent: Dec. 30, 2014

(54) METHOD OF PROTECTING VEHICLE OCCUPANTS IN A VEHICLE SEAT OF A VEHICLE

(75) Inventors: Karl-Heinz Baumann, Bondorf (DE); Michael Fehring, Neuhausen (DE)

(73) Assignee: Daimler AG, Stuttgart (DE)

( * ) Notice: Subject to any disclaimer, the term of this patent is extended or adjusted under 35 U.S.C. 154(b) by 668 days.

(21) Appl. No.: 12/890,107

(22) Filed: Sep. 24, 2010

(65) Prior Publication Data

US 2011/0077826 A1    Mar. 31, 2011

(30) Foreign Application Priority Data

Sep. 25, 2009  (DE) .......................... 10 2009 043 113

(51) Int. Cl.
| | |
|---|---|
| *B60R 22/00* | (2006.01) |
| *E05F 15/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60N 2/48* | (2006.01) |
| *B60N 2/427* | (2006.01) |

(52) U.S. Cl.
CPC ............ *B60N 2/4885* (2013.01); *B60N 2/4279* (2013.01); *B60N 2/42745* (2013.01)
USPC .......................................................... 701/45

(58) Field of Classification Search
CPC ..... B60N 2/2222; B60N 2/4838; B60N 2/643
USPC ............................................................ 701/45
See application file for complete search history.

(56) References Cited

U.S. PATENT DOCUMENTS

| | | | |
|---|---|---|---|
| 6,244,656 B1* | 6/2001 | Mueller | 297/216.13 |
| 6,666,292 B2* | 12/2003 | Takagi et al. | 180/274 |
| 6,938,953 B2* | 9/2005 | Håland et al. | 297/216.14 |
| 2003/0075907 A1* | 4/2003 | Baumann et al. | 280/735 |
| 2004/0195894 A1* | 10/2004 | Pal et al. | 297/406 |
| 2004/0245833 A1* | 12/2004 | Svantesson | 297/408 |
| 2005/0242634 A1* | 11/2005 | Serber | 297/216.1 |
| 2006/0055214 A1* | 3/2006 | Serber | 297/216.1 |
| 2007/0096514 A1* | 5/2007 | Haglund et al. | 297/216.12 |

FOREIGN PATENT DOCUMENTS

| | | |
|---|---|---|
| DE | 101 39 609 C1 | 8/2002 |
| DE | 20 2004 014 363 U1 | 2/2006 |
| WO | WO 2006/026967 A1 | 3/2006 |

* cited by examiner

*Primary Examiner* — Maceeh Anwari
(74) *Attorney, Agent, or Firm* — Crowell & Moring LLP

(57) ABSTRACT

In a method of protecting the occupant in a vehicle seat, particularly in a passenger car (the vehicle seat comprising at least a seat surface, a backrest and a headrest), upon detection of a present or imminent rear impact, by means of an active movement of the backrest and/or of the headrest, a force is applied to the vehicle occupant in the direction of the effect of the impact force occurring as a result of the rear impact.

16 Claims, 2 Drawing Sheets

METHOD OF PROTECTING VEHICLE OCCUPANTS IN A VEHICLE SEAT OF A VEHICLE

This application claims the priority of German patent document 10 2009 043 113.6, filed Sep. 25, 2009, the disclosure of which is expressly incorporated by reference herein.

The invention relates to a method of protecting an occupant of a vehicle seat in the case of a rear end collision.

German Patent Document DE 101 39 609 C1 describes a method of restraining vehicle occupants by which the stress upon the occupant during the restraining operation is reduced. In the case of the method of restraining occupants by reducing kinetic energy, a possible accident is sensed first and, at the latest, from the point in time of the first contact of the vehicle with the obstacle, a force acting with the direction of the impact is applied to the occupant, the force being set over the entire braking distance such that a constant acceleration acts upon the occupant so that the reduction of the kinetic energy takes place uniformly.

German Patent Document DE 20 2004 014 363 U1 describes a motor vehicle seat having a backrest and a headrest.

U.S. Pat. No. 6,666,292 B2 describes a restraining system for a vehicle occupant, wherein a sensor detects a rear impact and a control unit controls a belt system such that a vehicle occupant's head is moved in the direction of a headrest.

One object of the present invention is to provide a method of controlling a vehicle occupant restraint system which is improved in comparison to the prior art.

This and other objects and advantages are achieved by the method according to the invention for protecting the occupant of a vehicle seat (including at least a seat surface, a backrest and a headrest), particularly in a passenger car. According to the invention, in the event of a present or imminent rear impact, by an active movement of the backrest and/or of the headrest, a force is applied to the vehicle occupant in the direction of the effect of the impact force occurring as a result of the rear impact.

As a result of the active movement of the backrest and/or of the headrest, a momentum or kinetic impulse can be exerted on the vehicle occupant, which increases the distance between the vehicle occupant and a collision section at the rear of the vehicle that is colliding with the object or will collide with the object.

As a result of an early application of the momentum upon the vehicle occupant, an acceleration will act upon the vehicle occupant even before the occurrence of a collision, whereby a subsequently acting accident energy in the case of a rear impact (i.e., the absolute amount of the accident energy), and thereby a loading and/or acceleration maximum of the vehicle occupant, is reduced.

In the case of a conventional vehicle seat, the vehicle occupants would be accelerated in a time-delayed manner as a result of the elasticities of the vehicle and/or a distance from the vehicle seat, for example, by the vehicle occupant's forward displacement caused by a braking because of a collision danger. Additional loading and/or acceleration maximums of the vehicle occupant result from this time-delayed acceleration. This is reliably avoided by means of the present invention. The load upon the occupant is thereby reduced.

The momentum or kinetic impulse caused by the active movement of the backrest and/or of the headrest expediently acts upon the vehicle occupant in the position in which the vehicle occupant or at least a body region of the vehicle occupant rest against the backrest and/or the headrest of the vehicle seat.

The restraining of the vehicle occupant therefore starts much earlier than in the case of a conventional restraint system. In addition, the vehicle occupant will participate as early as possible in an acceleration as a result of the active movement of the backrest and/or the headrest in order to reduce acceleration peaks.

In a particularly advantageous embodiment, the invention permits the active movement of the backrest and/or of the headrest and thus a moving-away of the vehicle occupant from the collision point at the rear of the vehicle particularly as a reaction to a so-called pre-crash signal and thus before the vehicle actually collides with the object.

As a result of the active movement of the backrest and/or of the headrest, the vehicle occupant is moved away from the collision section of the vehicle, thus the collision point at the rear, whereby an additional distance is created between the vehicle occupant and the collision point. This additional distance represents an additional absorption path, whereby the consequences of the rear impact will be eased for the vehicle occupant.

Other objects, advantages and novel features of the present invention will become apparent from the following detailed description of the invention when considered in conjunction with the accompanying drawings.

DETAILED DESCRIPTION OF THE DRAWINGS

Mutually corresponding parts are provided with the same reference symbols in all figures.

FIGS. 1$a$ to 1$d$ schematically show the vehicle occupant 1 in different stages of a rear impact in a vehicle 2.

Figure 2:
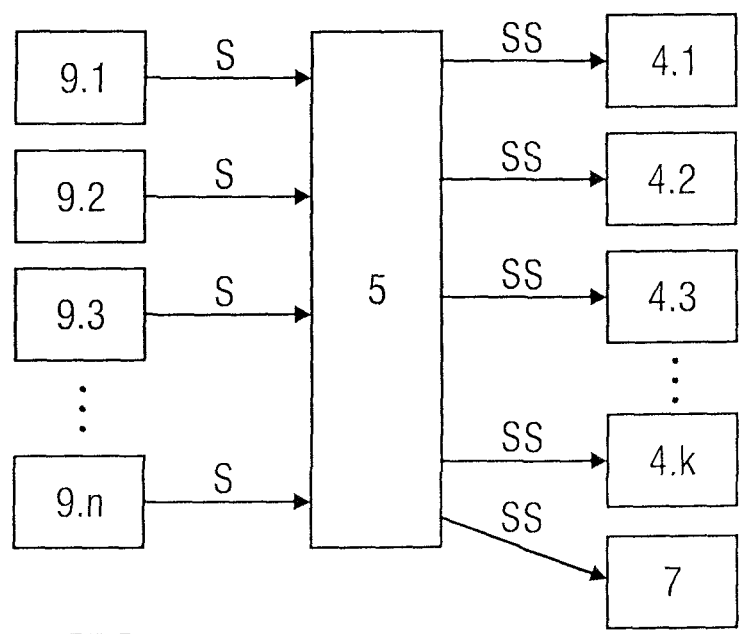
FIG. 2 is a schematic view of an arrangement for protecting a vehicle occupant in a vehicle seat.

FIG. 2 illustrates an arrangement 3 for protecting a vehicle occupant, which includes different protection elements 4.1 to 4.$k$ that are used, for example, for a lateral support and/or an easing of an impact shock by the inflation of airbags. In particular, the arrangement 3 comprises a control unit 5 which may, for example, be a component of a control device existing in the vehicle 1. The protection elements 4.1 to 4.$k$ are assigned to at least one vehicle seat 6.

The protection elements 4.1 to 4.$k$ are arranged at the vehicle seat 6 and can be triggered for protecting a vehicle occupant 1 situated in the vehicle seat 6. An actively movable backrest and/or a headrest arranged on the vehicle seat 6, for example, are used as protection elements 4.1 to 4.$k$.

In the following, the protection element 4.1 will be called a backrest 4.1 and the protection element 4.2 will be called a headrest 4.2.

The backrest 4.1 can actively be moved about a swivel axis which corresponds to the swivel axis of a conventional backrest. A movement of the backrest 4.1 about this swivel axis results in a tilting motion of the backrest 4.1. The active mobility is made possible, for example, by means of a spring that can be triggered by a control signal SS of the control unit 5 or a pyrotechnical charge, similar to the pyrotechnical charge in a seat belt tightener or an airbag.

In an embodiment, the headrest 4.2 is a conventional headrest and is rigidly connected with the actively movable backrest 4.1 and can be moved jointly with the latter as a result of the movement of the backrest 4.1.

In an alternative embodiment, the headrest 4.2 is constructed as a known, so-called active, headrest and is movably connected with the actively movable backrest 4.1. Such an active headrest 4.2 can be moved and controlled separately and independently of the backrest 4.1.

In an alternative embodiment, the headrest 4.2 is constructed as a conventional, so-called reactive, headrest and is movably connected with the actively movable backrest 4.1. Such a reactive headrest 4.2 can be controlled by a pressure on the backrest 4.1 acting by way of the vehicle occupant 1.

Furthermore, the arrangement 3 may comprise a belt tightener 7. The belt tightener 7 is a conventional protection device which, when activated, by means of mechanical tightening, holds the upper part 8 of the vehicle occupant's body as closely as possible against the backrest 4.1 and thus restrains the vehicle occupant 1. In this case, when the belt tightener is triggered, the vehicle occupant 1 is moved by means of the belt tightener 7 from a forward-displaced position in the direction of the backrest 4.1 and is fixed.

The backrest 4.1, the headrest 4.2 and/or the belt tightener 7 are usually triggered in the event of a present or imminent rear impact. For a timely triggering of the backrest 4.1 and of the headrest 4.2, signals S can be supplied to the control unit 5 from sensors 9.1 to 9.*n* connected with this control unit 5 and/or from other control units. For example, sensor signals of at least one environment detection unit, of at least one acceleration sensor, of a speed sensor, of a rotational speed sensor and/or data signals, such as a pre-crash signal, of another control unit can be fed to the control unit 5. The control unit 5 comprises processing modules (not shown in detail), which process the supplied signals S to a pre-crash signal and, resulting therefrom, to control signals SS for controlling at least the backrest 4.1, the headrest 4.2 and/or the belt tightener 7. As an alternative or in addition, the sent pre-crash signal can be processed to control signals SS by means of the control unit 5.

Figure 1A:
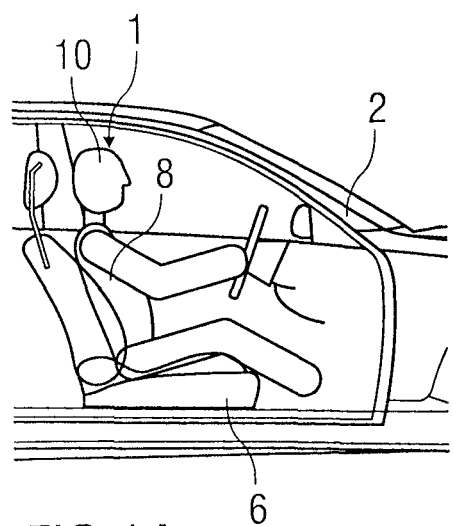
FIGS. 1$a$ to 1$d$ are schematic views of a vehicle occupant in different stages of a rear impact.

The invention is based on the idea that, in the event of a rear impact, the vehicle occupant 1 is accelerated in a time-delayed manner because the vehicle occupant is sitting at a distance from the backrest 4.1 or a seat cushion or has to overcome a slack or clearance, for example, a softness of a seat foam, or a bent-forward sitting posture. Such a condition is illustrated in FIG. 1*a*. In order to let the vehicle occupant 1 participate in the acceleration as early as possible, with the goal of reducing acceleration loads onto the vehicle occupant 1 in the event of a collision, an acceleration impulse or an acceleration momentum is exercised upon the vehicle occupant 1 even before the rear impact and thus as early as possible by means of the actively movable backrest 4.1 and the headrest 4.2. In other words, the vehicle occupant 1 is pre-accelerated.

Figure 1B:
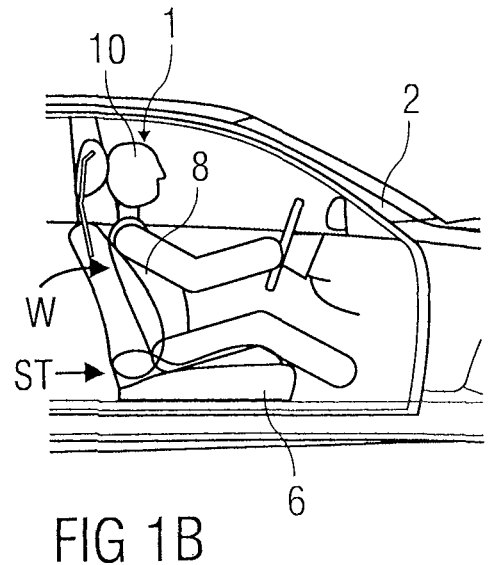

In order to achieve a pre-acceleration that is as optimal as possible,—i.e. a suitable vehicle occupant impulse by the active movement of the backrest 4.1 and/or the headrest 4.2,—an active movement of the backrest 4.1 and/or the headrest 4.2 in the direction of the vehicle occupant 1 or at least a body section of the vehicle occupant 1 is already triggered when a braking of the vehicle 2 is detected which, with respect to time, is triggered before an imminent rear impact. This condition is illustrated in FIG. 1*b*. A pre-triggering of the active movement of the backrest 4.1 and/or of the headrest 4.2 takes place, whereby the backrest 4.1 and/or the headrest 4.2 is moved in the direction of the vehicle occupant 1 or at least a body section of the vehicle occupant 1, and/or the vehicle occupant 1 or at least a body section of the vehicle occupant 1 rests against the backrest 4.1 and/or the headrest 4.2 of the vehicle seat 6. As a result, the vehicle occupant 1 takes up an optimal position in which the upper part of the vehicle occupant's 1 body rests as completely as possible against the backrest 4.1 and the head 10 rests against the headrest 4.2.

Figure 1C:
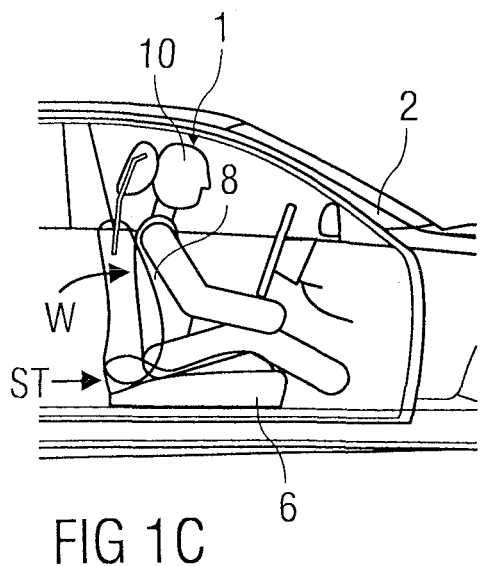

The impulse resulting from the triggering of the active movement of the backrest 4.1 and/or of the headrest 4.2 and the vehicle occupant's 1 subsequent movement along the path W in the direction of the impact force ST acting as a result of the rear impact, preferably starts before the occurrence of the collision. The pre-impulse on the vehicle occupant 1 resulting from the triggering of the active movement of the backrest 4.1 and/or of the headrest 4.2 in this case is the greater the more completely the vehicle occupant 1 rests against the backrest 4.1. This pre-impulse upon the vehicle occupant 1 is illustrated in FIG. 1*c*.

Figure 1D:
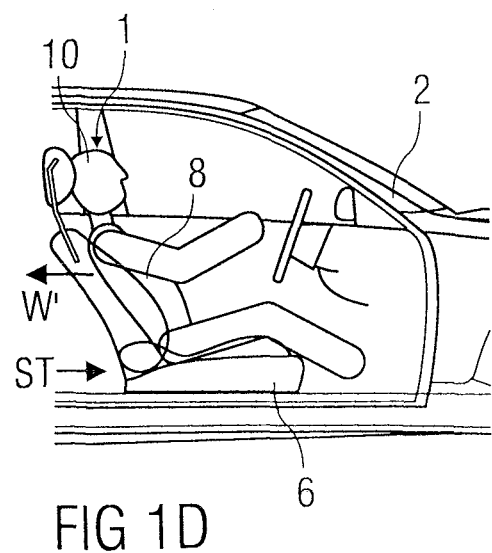

By such a combination of a pre-triggering of the active movement of the backrest 4.1 and/or of the headrest 4.2, and the triggering of the active movement of the backrest 4.1 and/or of the headrest 4.2, it is ensured that, by taking up a suitable sitting position and by means of a resulting optimal impulse by triggering the active movement of the backrest 4.1 and/or of the headrest 4.2 in the impact direction of the impact force ST of the rear impact, the vehicle occupant 1 will be pre-accelerated and his distance from the vehicle rear facing the impact is thereby enlarged. As soon as the momentum of the impact shock dominates, the path W already covered by the vehicle occupant 1 can be utilized again as an additional deformation path W' in the direction opposite to the impact direction of the impact force ST. This process is illustrated in FIG. 1*d*. As a result, the impact shock will be eased for the vehicle occupant 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of protecting an occupant of a vehicle seat having at least a seat surface and a backrest, said method comprising:
    detecting a present or imminent rear impact by a control unit;
    pre-triggering active movement of the backrest by actively moving the backrest, from a first position to a second position, in a direction of at least a body section of the vehicle occupant so that the backrest is moved in a direction of at least a body section of the vehicle occupant, or at least a body section of the vehicle occupant rests against the backrest of the vehicle seat;
    applying a force to said occupant in the direction of an impact force occurring as a result of the rear impact, by causing an active movement of the backrest from the second position to a third position; and
    allowing the backrest to move from the third position when a momentum acting on the vehicle occupant is dominated by an impact shock caused by the rear impact.

2. The method of claim 1, wherein the allowance of the backrest to move from the third position comprises allowing the backrest to return from the third position to the first position when the momentum acting on the vehicle occupant is dominated by the impact shock caused by the rear impact.

3. The method according to claim 2, wherein the force acts planely upon the vehicle occupant.

4. The method according to claim 2, wherein the active movement of the backrest is controlled or triggered as a function of a control signal that signals a presently occurring or imminent rear impact of the vehicle with an object or a predefined braking of the vehicle.

5. The method according to claim 2, wherein, by the active movement of the backrest, a momentum is exercised on at least a body section of the vehicle occupant, by which the latter is accelerated and moved in a direction of an effect of the impact force acting as a result of the rear impact.

6. The method according to claim 2, wherein the pre-trigger occurs during a braking of the vehicle triggered before an imminent rear impact.

7. The method according to claim 2, wherein the active movement of the backrest is caused by a spring.

8. The method according to claim 2, wherein the active movement of the backrest is caused by a pyrotechnic charge.

9. A method of protecting an occupant of a vehicle seat having at least a seat surface and a backrest, said method comprising:
- detecting whether an imminent rear impact will occur;
- detecting whether the vehicle is being braked, wherein when braking of the vehicle is detected prior to detecting that an imminent rear impact will occur, pre-triggering active movement of the backrest by
  - actively moving the backrest, from a first position to a second position, in a direction of at least a body section of the vehicle occupant so that the backrest is moved in a direction of at least a body section of the vehicle occupant, or at least a body section of the vehicle occupant rests against the backrest of the vehicle seat,
- applying, when occurrence of an imminent rear impact is detected after the pre-triggering, a force to said occupant in the direction of an impact force occurring as a result of the rear impact, by causing an active movement of the backrest from the second position to a third position, and
- allowing the backrest to move from the third position when a momentum acting on the vehicle occupant is dominated by an impact shock caused by the rear impact.

10. The method of claim 9, wherein the allowance of the backrest to move from the third position comprises allowing the backrest to return from the third position to the first position when the momentum acting on the vehicle occupant is dominated by the impact shock caused by the rear impact.

11. The method according to claim 10, wherein the active movement of the backrest is caused by a spring.

12. The method according to claim 10, wherein the active movement of the backrest is caused by a pyrotechnic charge.

13. The method according to claim 10, wherein the force acts planely upon the vehicle occupant.

14. The method according to claim 10, wherein the active movement of the backrest is controlled or triggered as a function of a control signal that signals an imminent rear impact of the vehicle with an object or a predefined braking of the vehicle.

15. The method according to claim 10, wherein, by the active movement of the backrest, a momentum is exercised on at least a body section of the vehicle occupant, by which the latter is accelerated and moved in a direction of an effect of the impact force acting as a result of the rear impact.

16. The method according to claim 10, wherein acceleration and movement of the vehicle occupant as a result of active movement of the backrest is started before occurrence of the rear impact.

\* \* \* \* \*